Sept. 25, 1951     H. O. SCHJOLIN     2,569,341
V GEAR TRANSMISSION
Filed Nov. 5, 1945     5 Sheets-Sheet 1
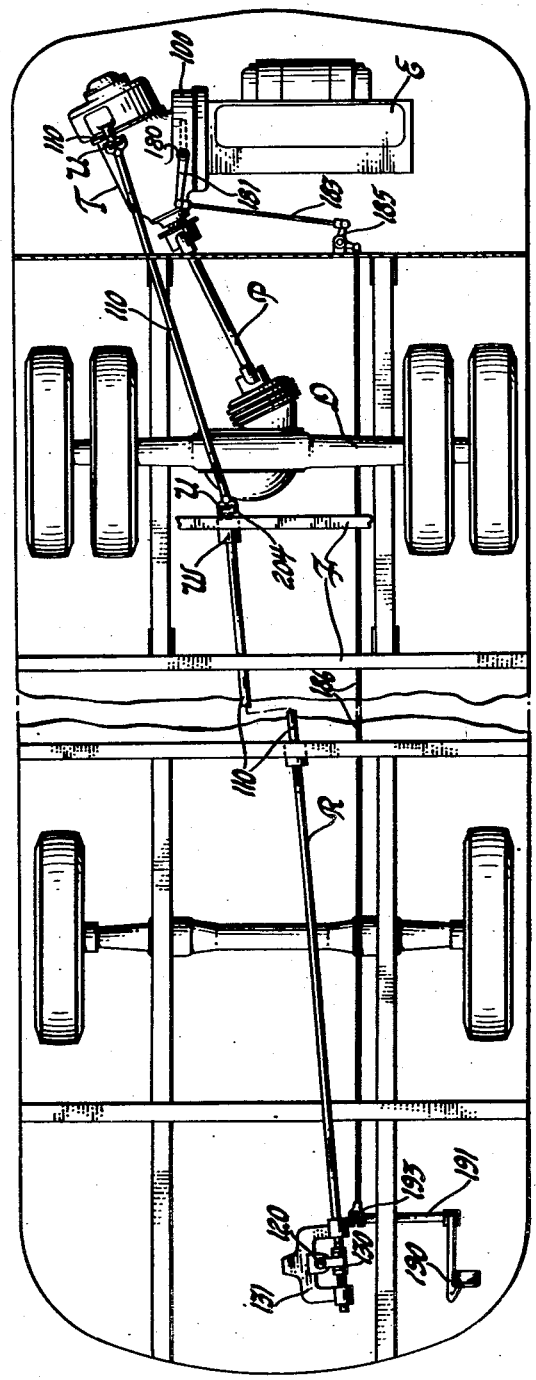
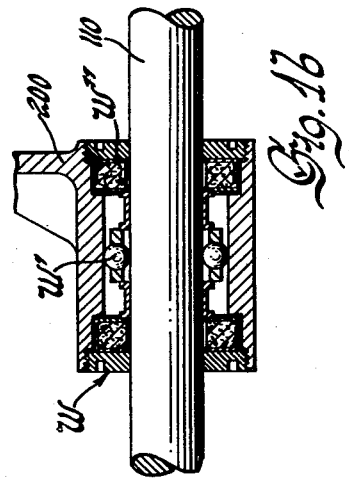
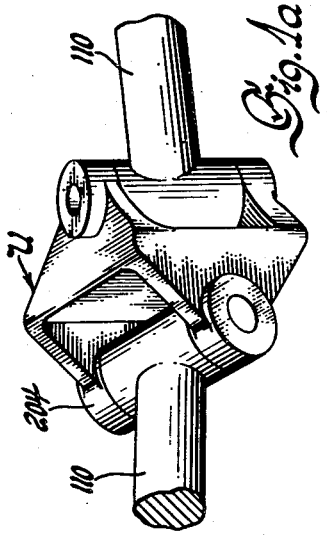
Inventor
Hans O. Schjolin Sept. 25, 1951   H. O. SCHJOLIN   2,569,341
V GEAR TRANSMISSION
Filed Nov. 5, 1945   5 Sheets-Sheet 2
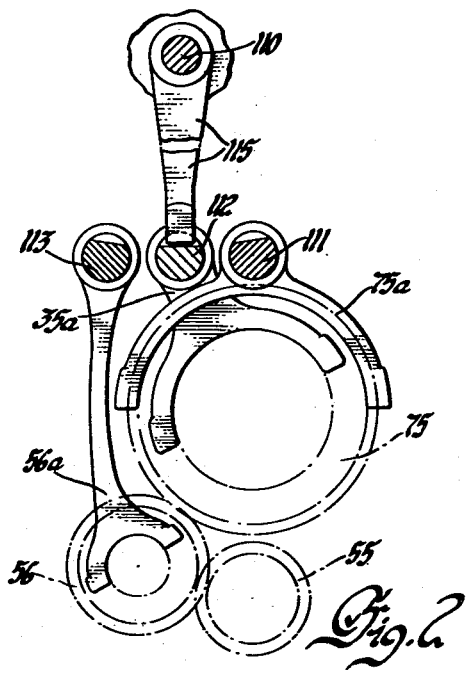
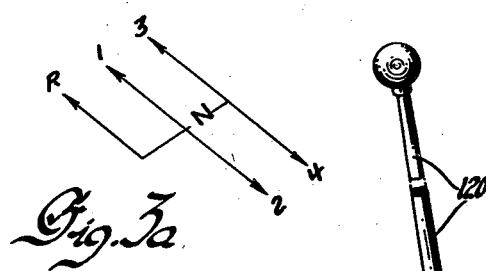
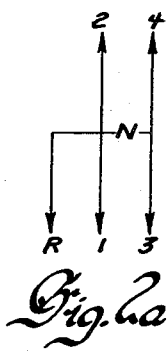
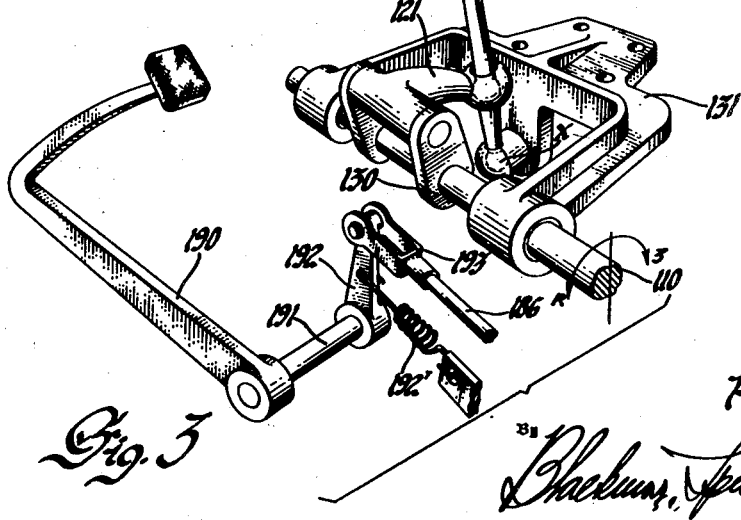
Inventor
Hans O. Schjolin
By Blackmun, Spencer & Flint
Attorneys Inventor
Hans O. Schjolin Inventor
Hans O. Schjolin
By
Attorneys Sept. 25, 1951  H. O. SCHJOLIN  2,569,341
V GEAR TRANSMISSION
Filed Nov. 5, 1945  5 Sheets—Sheet 5

Inventor
Hans O. Schjolin
By Blackmore, Spencer & Flint
Attorneys

Patented Sept. 25, 1951

2,569,341

UNITED STATES PATENT OFFICE 2,569,341

V-GEAR TRANSMISSION

Hans O. Schjolin, Birmingham, Mich., assignor to General Motors Corporation, Detroit, Mich., a corporation of Delaware Application November 5, 1945, Serial No. 626,680

8 Claims. (Cl. 74—700)

The present invention pertains to a special arrangement of engine, gearing and axle drive of large vehicles for the primary purpose of providing superior accessibility for replacement of units, for better space distribution of drive members and units, and for obtaining an improved assembly thereof for lightness in weight and better geometry of the drive line centers.

It is particularly adaptable for heavy vehicles having rear-mounted power plant drive systems.

One of the features provided herein is the angular arrangement of a gearbox with respect to the engine centerline, said gearbox having a particular mass division of the torque converting groups of the gear unit which provides a very low mass coupling arm about the engine center, and which makes possible the shortening of the overall torque reaction moment arms to a considerable degree.

A further object of the invention, achieved in the arrangement described, is the reduction in the overall height of the power plant mass center which provision enables the torque reactions to be more closely supported with respect to the drive centerline.

Another object of the invention is to couple the power of the engine to the transmission through a torque multiplying gear which converts the torque at a lower speed ratio to the angularly placed transmission input member, which in the example herewith is a hollow shaft supported in the diagonal transmission casing at both its ends, with the power delivery element located immediately adjacent to the point of reduction gear drive, both elements lying between the hollow shaft supporting bearings in the casing.

Other objects include the provision of a power plant assembly mounted transversely at the rear of a vehicle with the torque converting mechanism thereof located angularly to the centerline of the engine and driving the forwardly located vehicle wheel differential device at a point centrally of the vehicle, or on the vehicle centerline.

A further object is the provision of remote control means for a rear-mounted power plant and transmission assembly in which the gear selection action is transmitted thereto by rotational motion of selector shafting rocked by parallel arm mechanism and in which the gear coupling and uncoupling action is transmitted thereto by sliding motion of the said selector shafting moved longitudinally by the translation of said mechanism, the master control element being universally pivoted.

Another object is the provision of universal joint means in said selector shatfing connections solidly coupling the elements of said shafting such that for given operator translation of said mechanism, the said coupling and uncoupling of the gears follows directly the said translation action thru sliding of said joint means and said shafting elements, with a minimum of lost motion.

An additional object is the providing of a remote ratio shift control for a four-speed-and-reverse gear unit having selector and actuator mechanism coupled to articulated shafting, which applies a tensional force to said shafting for shifts to reverse low and third gear ratio, a compressional force for shifts to second and fourth speeds, and a parallel arm rocking force which is applied in turn to rock a selection and actuation member for the gears.

Other objects and advantages will appear in the specification below as the subject matter is discussed in detail. In the figures:

Fig. 1 is a plan view of an installation of the invention in a motor vehicle, including the control connections. Fig. 1a is a view of the universal coupling of the transmission control mechanism and Fig. 1b is a sectional view of the supporting means for the clutch control in the vehicle frame, by mounting unit W.

Fig. 2 is a schematic view of the internal transmission control mechanism operated by the connections of Fig. 1, the Fig. 2a showing the positional motion pattern for the ratios. Fig. 3 is a view of the control mechanism located in the driver's station at the front of the vehicle as in Fig. 1, and Fig. 3a is a diagram of the ratio shift motions of the gear selector lever, corresponding to the ratio diagram of Fig. 2a showing the shifter head pattern inside the gearbox.

Figure 4:
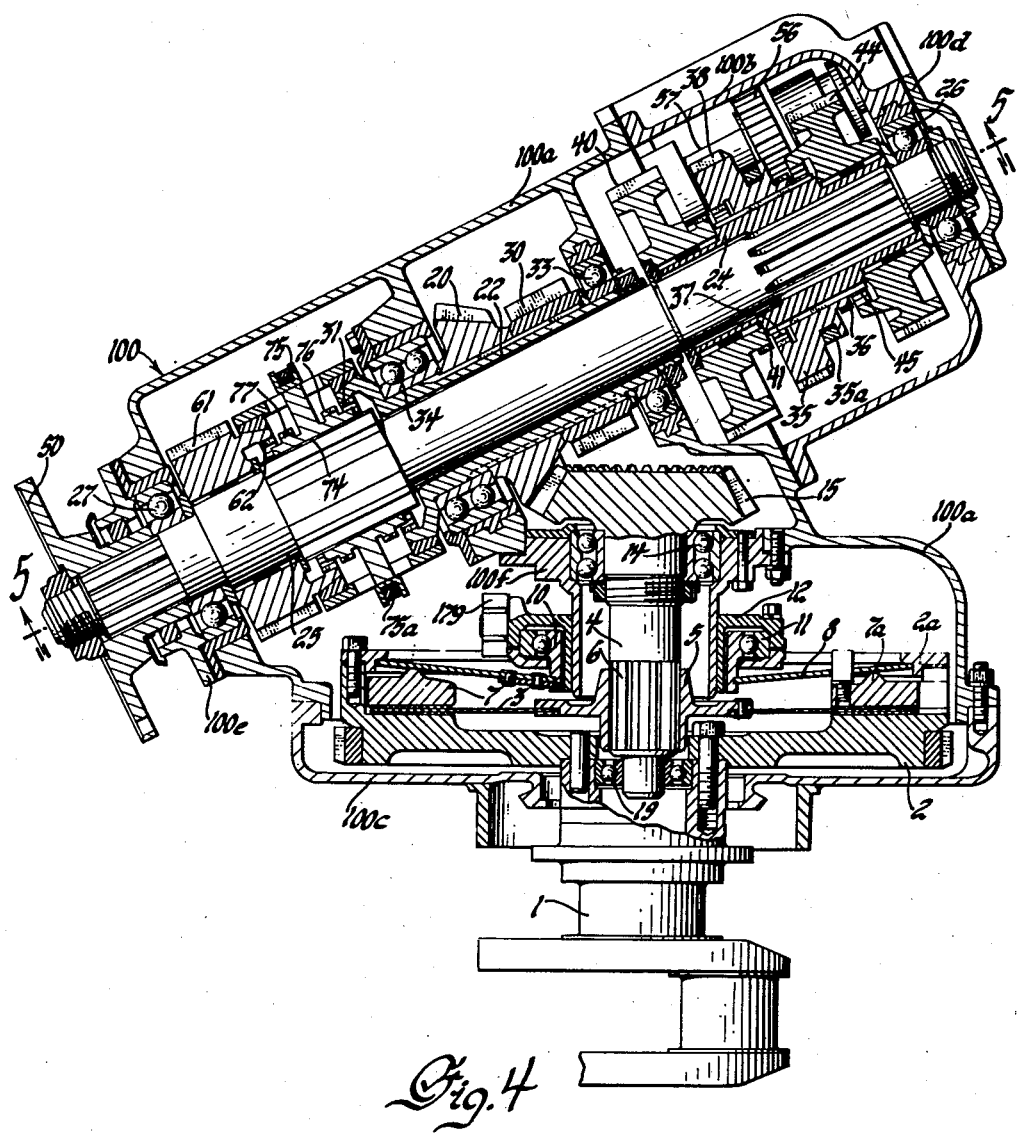
Fig. 4 is a plan view in section of the gearbox of Fig. 1, Fig. 5 being taken at 5—5 in a vertical plane of Fig. 4 to show the space distribution of the gear and shifter elements.

Figure 1 shows a plan view layout of a vehicle in which the invention is installed. The section at the right shows the engine assembly E, the transmission assembly T, the propeller shaft P and the drive differential D driving the vehicle rear wheels. As will be understood further the vehicle main clutch is controlled by a fork operated through external lever mechanism from the driver's station at the front of the vehicle.

Shaft 180 supported in the casing section 100 is attached to the clutch fork 179 inside the casing 100, and projects externally to the top of the gear box where lever 181 is attached to it. Bellcrank 185 is supported on the transverse bulkhead and is linked to the lever by rod 183, and to long rod 186 which extends to the forward portion of the vehicle. Rod 110 is supported in flexible bushings as shown in Fig. 1b in the various bulkheads cross members so that it has straightforward rectilinear motion, shaft R being a continuation of shaft 110.

Clutch pedal 190 shown in Fig. 3 in detail, is attached to cross shaft 191 supported on the frame for rotation, and the latter is attached to lever 192 clevised at 193 to rod 186, and the pedal is normally retracted by a spring 192' which is deflected upon operator foot pressure.

Figure 5:
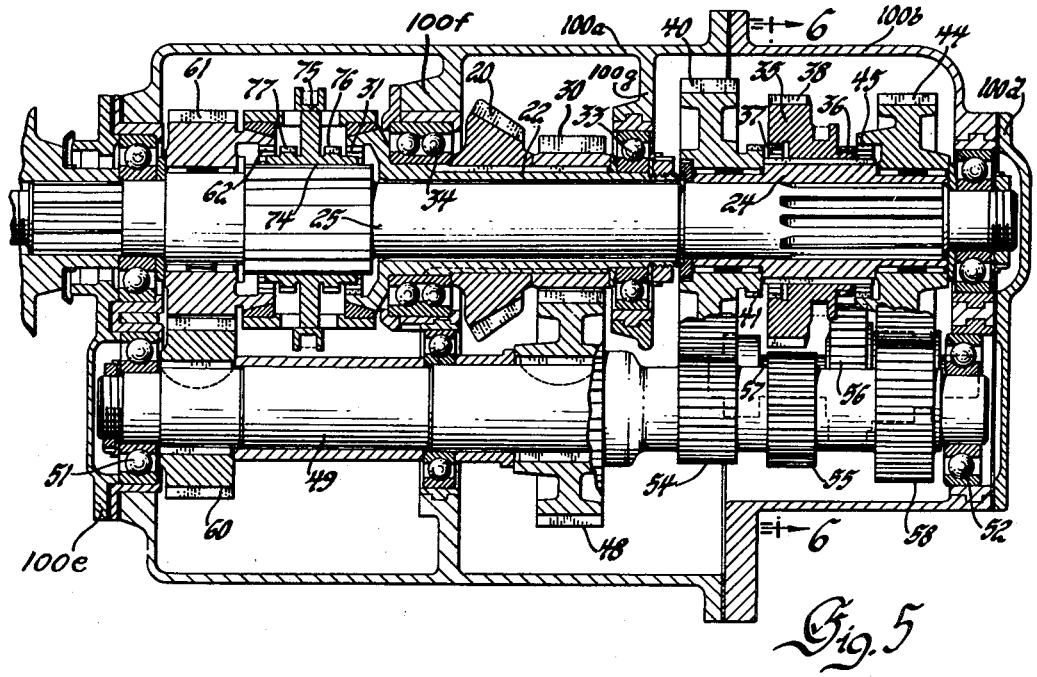
Figure 6:
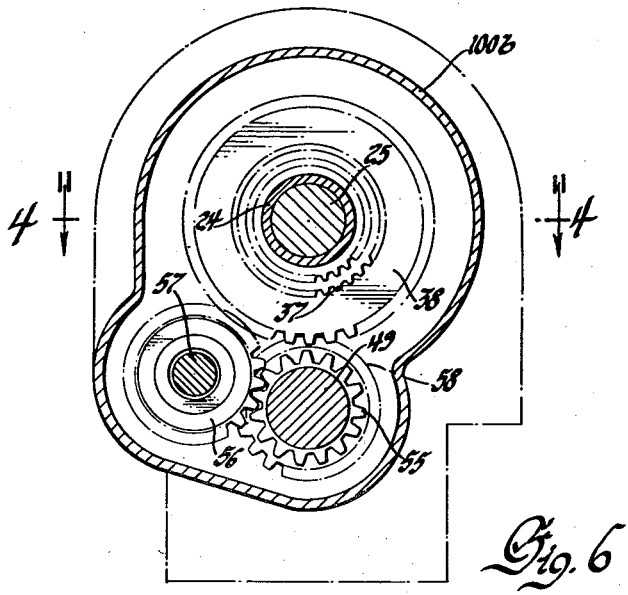
Fig. 6 is a vertical view at 6—6 of Fig. 5 to show the connections of the reverse gear group.

The control mechanism of Figs. 1 to 3 is applied to the drive structures of Figs. 4 to 6, that of Fig. 2 pertaining to the mechanism mounted in or on the gearbox, and that of Fig. 3 to the operator's control means located remotely at the front of the vehicle.

Fig. 2 requires to be studied in connection with Figs. 4 and 5.

As shown in Fig. 5 the input member of the angularly-placed transmission unit of Figs. 4 and 5 is hollow shaft 22 fitted with gear 30 and bevel gear 20 meshed with and driven by clutch shaft bevel gear 15, hollow shaft 22 being supported in casing section 100a by bearings 33 and 34.

Countershaft 49 mounted in bearings 51, 52 and as shown, is driven by input gear 30 meshing with gear 48 affixed to shaft 49, and transmits reduction gear torque to the various elements rotating with transmission shaft 25.

Low gear torque is transmitted thru meshed gears 54—40 to double-jaw slider 35, splined to sleeve 24. It will be noted that the planar section representing the toothed area of torque transfer is adjacent bearing 33 and close to the engine centerline for maximum support of the loads at the strongest beam load supporting section.

Second gear torque is transmitted thru gear pair 58, 44 and teeth 45, 36 of the jaw clutch of slider 35, and the low-2nd-low ratio transitions are made by shift reciprocation of slider 35 on spline sleeve 24 of shaft 25.

Reverse torque is obtained by independent motion of reverse idler 56 in common mesh with the external teeth 38 of slider 35 and countershaft gear 55.

The gear member of largest size and heaviest torque requirement is located close to the engine centerline wherever possible.

The third speed torque is transmitted thru gear pair 60, 61 to slider 75 splined on shaft 25 at 74, and thru the jaw clutch teeth 62, 77. Direct drive between shafts 22 and 25 is obtained by meshing the jaw teeth 31, 76 of shaft 22 and slider 75.

The shifter pattern for Fig. 5 for obtaining these drive ratios in terms of left, neutral and right shift, is:

|  | Slider 35 | Slider 75 | Idler Gear 56 |
|---|---|---|---|
|  | L. N. R. | L. N. R. |  |
| Reverse | - x - | - x - | L |
| Neutral | - x - | - x - | - |
| Low | x - - | - x - | - |
| Second | - - x | - x - | - |
| Third | - x - | x - - | - |
| Direct | - x - | - - x | - |

This is a special form of 4-speed and reverse gear in which the input member is a relatively long hollow shaft supported separately in centrally located casing bearings, and equipped with a single transmission input gear and a single direct drive jaw. The straddle form of gear unit having a central point of input reduction speed transfer and laterally spaced low torque, and high torque groups provides a maximum of strength with lightness of the supporting structure.

Figs. 4 and 5 show the arrangement of the casing portions 100a to 100f which form the assembly for support of the drive mechanism on the engine.

The rightward end of the angularly-placed gear assembly of Fig. 4 is readily removed by taking off end plate 100d, releasing the screw-and-nut fittings on the ends of shaft 25 by performing a similar loosening of the countershaft 49, and detaching of 100b from 100a. This enables ready repair and adjustment of the gear elements which receive the most wear, and without disturbing the high speed gearing in the compartment 100a, or the input driving gear group. The first housing section 100a has a transverse web 100g and a second, transverse web 100f shown in Fig. 5 supporting the bearings 33 and 34 for hollow shaft 22 which is the input power member of the transmission unit.

Figure 2 is a sectional view of the shifter forks of transmission casing 100b to show the arrangement of the gear and shifter mechanism. The casing 100b is attached to the flywheel-enclosing, and main clutch housing section of the engine 100a, and is machined to accommodate longitudinal motion of the slider forks and rods. The fork 75a is affixed to rail 111, and is moved longitudinally to mesh and demesh the jaw clutch portions of the 3rd-4th slider 75 shown in Figs. 4 and 5. The master shifter rod shaft 110 is mounted parallel to the rails for both axial and rotational motion so that its affixed finger lever 115 may swing about the axis of shaft 110 and intersect the radial cut notches in the shift rails.

The shifter 35 of Fig. 4 is similarly moved by fork 35a attached to shift rail 112 mounted in the casing for parallel movement with shaft 110 and the other rails.

The reverse idler gear 56 of Fig. 5 is shifted by fork 56a attached to shift rail 113.

With the gear mechanism in neutral the notches of the rails are in alignment so that the lever 115 of the master shifter shaft 110 may swing freely to intersect any one of the three. To facilitate understanding of this shifter motion the number and letter pattern of Fig. 2a is shown and Fig. 3a upward and to the left of Fig. 3 is in alignment with the shift lever 120. The longitudinal centerlines of the shifter shafts and rails, corresponding, are shown in Fig. 2a. The numeral 200 indicates in Fig. 1b an extension of one of the frame members F for the supporting unit W which has the central ball member W' and the seal elements W'' enclosed by appropriate end plate.

When the shifter shaft 110 is rotated clockwise to its limit of motion in Fig. 2 the arm 115 intersects the notch of rail 113 so that when the shifter shaft is moved upward and to the left in Fig. 3 the reverse idler fork 56a slides the gear 56 on idler shaft 57 of Fig. 6 into mesh with countershaft gear 55 and the teeth 38 of slider 35. This establishes reverse gear drive. Reverse is demeshed by corresponding opposite motions.

To understand clearly how the gear selector mechanism of Figs. 1, 2 and 3 operates to shift the sliders of Fig. 5, it should be observed that the shift rails 111, 112, 113 of Fig. 2 follow a shift pattern as indicated in the diagram of Fig. 2a, the shifter finger 115 sliding with shaft 110 and moving the rails in a direction at right angles to the cross-shift line at N, to engage a ratio, and rocking to select one of the three rails as the shaft 110 is rotated by the external mechanism of Fig. 1.

In viewing Fig. 1 it will be seen that if shaft 110 is rotated clockwise, as viewed from the bottom of the figure, shaft 110 and finger of Fig. 2 will be similarly rotated in the plane view and will intersect notch of rail 113, which moves the reverse idler fork 56a. Now to shift the idler gear 56 from neutral toward the engine shaft center so as to pick up gears 55 and 38, the shaft 110 must be pulled toward the eye of the observer in Figs. 2 and 2a. This requires the structure of Fig. 3 to apply a pull on shaft 110 upward and to the left, following the rocking motion, which as viewed in Fig. 3 is shown by the arrow at R to be a counterclockwise motion.

The inclining of the shift lever and motion upward and to the left, as shown in Figs. 3 and 3a will therefore mesh the reverse gear.

Similarly, rocking the gearlever 120 to the right, rotates shaft 110 clockwise as viewed in Fig. 3, counterclockwise in Fig. 2, and causes finger 115 to enter the notch of rail 111 to move fork 75a of slider 75 of Fig. 5 when the head of the lever is moved to "3" or "4," for third or fourth gear. A pull on shaft 110 will cause slider 75 to mesh teeth 77—62 to couple the 3rd gear pair 60, 61 to transmission shaft 25 and to the input torque path thru gears 20, 30, 48.

The above motions are of course paralleled for the selection of 2nd and 4th gear, as should be clear from the notations on the drawings, as described below.

When low gear is desired, the shifter shaft 110 is rocked to intermediate position so that the lever 115 intersects the notch of shaft 112, and following motion being a pulling action similar to that for reverse, to move the fork 35a and slider 35 to mesh the jaw clutch teeth 37, 41, and couple the countershaft gear 54, and gear 40, to the output shaft 25. Reverse of these motions demeshes low gear drive.

The arm 115 of master shaft 110 when in intermediate rocking position may be shifted axially to move rail 112 in the opposite direction which moves the slider 35 to engage the jaw teeth 36, 45, and connects the countershaft gear 58 and the gear 44 to drive the output shaft 25 in second speed gear ratio.

The shift rail 111 attached to the fork 75a is moved to mesh jaw teeth 77, 62 in order to transmit third speed gear ratio from countershaft gear 60 and 61 to the output shaft 25. Direct drive is obtained by registering the arm 115 of shaft 110 with the notch of rail 111 and sliding the rail oppositely to the above 3rd speed motion.

External to the gear box in Fig. 1 is universal coupling U made as shown in Fig. 1a, and pivoted to shaft 110 extended and articulated at 204, its extension being supported in the frame cross member just forward of the driving axial center. The articulated shaft 110 terminates in the driver's station at the front of the vehicle in a crank fitting 130, and supported for longitudinal and rocking motion in a yoke member 131. The operator's gear shift control consists of a lever 120 swiveling in an arm 121 of fitting 130 and supported for rocking motion at a fulcrum point X formed in the base of the yoke member. The letter and number diagram shown in connection with Fig. 3 indicates the movements of the shift lever with respect to the hand of the driver, for the different gear ratios. It will be observed that forward movement of the head of the gear lever 120 will slide the fitting 130 forward, and thereby slide the fitting 130 in the same direction, to place the shaft 110 and attached couplings under tension which by reference to Figs. 1 and 2 will translate the master shaft 110 and arm 115 to mesh the gear elements for reverse low or third speed ratio, while putting this shaft structure under compression by rocking of lever 120 rearwardly will cause the second or fourth (direct) gear elements to be coupled.

The main clutch 2, 7, 5 is engaged and disengaged by pedal 190 of Fig. 3, for all ratio changes in the customary manner. (See Fig. 4.)

The arrangement of driving elements may be described as a V form of transmission, which however, is only descriptive of the power unit arrangement.

The engine shaft 1 shown in part, in Fig. 4, terminates in a recessed flange having external axial bolt holes for attachment to the flywheel 2, and an internal recess for mounting pilot bearing 19 of the clutch jack shaft 4.

Jack shaft 4 is splined at 6 to accommodate the hub 5 of the clutch driven plate 3. The flywheel 2 has a mounted presser plate 7 operated by disc spring 8. The flywheel ring 2a is recessed radially and internally as a seat for the periphery of the disc spring 8, and the presser plate 7 has an elevated ridge 7a against which the disc spring 8 may bear. The inner radial portion of the disc spring 8 is seated in a sliding collar 10 mounted on the extension of the housing, and supported in the bearing 11, the collar 12 of which is supported by external means for the purpose of applying or disengaging the presser plate from the clutch disc. The disc 8 self-loads the clutch for normal engagement.

The casing assembly 100 is divided at a point convenient for assembly and repair of the clutch, and the clutch compartment is formed by the sections 100c, and 100a which extends farther to the point where it is joined to the transmission case section 100b.

The jack shaft 4, mounted in the casing sub-section 100f on bearing 14, is securely held against axial travel by a common form of screw collar fitting. Jack shaft 4 is formed into bevel teeth 15 which over-hang and mesh with primary input bevel gear 20 of the diagonally placed gear box.

The transmission casing is built up of sections as shown in Fig. 1, section 100b housing the low, second and reverse speed gear groups; and section 100a containing the primary drive from the engine, and the synchronized third and fourth speed gear groups.

The transmission shaft 25 extends through both casing sections 100a and 100b and is mounted in bearing 26 at one end and the bearing 27 at the remote end where output flange 50 is splined. In the central part of the transmission, rotatable sleeve 22 surrounds the transmission shaft 25 and carries the bevel gear 20 meshing with bevel gear 15, carries the reduction drive input gear 30 and is formed into jaw clutch 31 which, as will be seen, is for the purpose of obtaining direct drive. The sleeve 22 is mounted in the web 100g of the casing section 100a by bearing 33, and by double row bearing 34 on the opposite side in web 100f, to provide a rigid, accurate mounting so that the bevel gears 15 and 20 will run true. The gear pair 15—20 with sleeve 22 and input gear 30 may be changed to a lower or higher ratio to accommodate various engines having differing torques for given shaft speeds, providing adaptability to field replacement.

For low and second speed drive, splined sleeve 24 of the transmission shaft 25 carries the double jaw slider 35 with external teeth 36, and 37, and having gear teeth 38 cut on its periphery. The 2nd reduction output gear 44 is mounted by needle bearings on sleeve 24 and has internal teeth 45 which may mesh with the teeth 36 of the aforesaid jaw clutch. On the opposite side of the jaw clutch slider, gear 40 is mounted likewise on needle bearings and has jaw teeth 41 which may mesh with the internal jaw teeth 37 on the low and second gear slider for low gear drive.

The counter shaft 49 is supported in bearings 51 and 52 in the case sections as shown and has three gears formed integrally or attached, the first gear 58, meshing with 2nd gear 44, the second gear 55 meshing with slidable reverse idler gear 56 mounted on the reverse idler stub shaft 57, and the third gear 54 meshing with the lowest speed gear 40. Gear 48 is the input gear, and gear 60 is the 3rd speed input gear.

The central part of the counter shaft 49 is keyed to the counter shaft input gear 48 constantly meshing with the main shaft reduction input gear 30 of sleeve 24. At the far end of the transmission is located the third speed pair of meshing gears, gear 60 being keyed to the counter shaft 49 and its companion gear 61 mounted on needle bearings on the transmission shaft 25 and having overhanging jaw clutch 62.

Transmission shaft 25 is splined to accommodate slider 75 having two rings of external teeth 76 and 77 for meshing respectively with the teeth 31 of sleeve 22 for direct drive, and with the teeth 62 of the third speed output gear, for setting up third speed ratio.

In the drawings, the reverse idler gear 56 is shown conventionally. Fig. 5 shows that the idler gear 56 meshes not only with gear 55 of the counter shaft 49, but also with the external ring of teeth 38 of slider 35 rotating with sleeve 24 splined to the transmission shaft 25.

The above described drive layout provides a novel form of angular drive transmission which enables the designer of special purpose vehicles to fit the drive mechanism with the change speed gearing into a space of very restricted volume. The views of Figs. 7 and 8 show a comparison between the standard angle drive now in public use, and popularly accepted as in Fig. 7; and the novel arrangement of the present disclosure as in Fig. 8 in heavy line.

Figure 7:
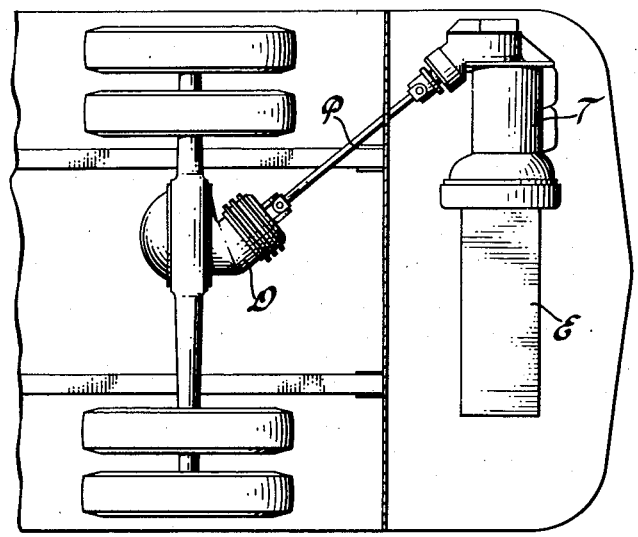
Fig. 7 is a plan view similar to Fig. 1 of a conventional rear-engine and power plant arrangement.
Figure 8:
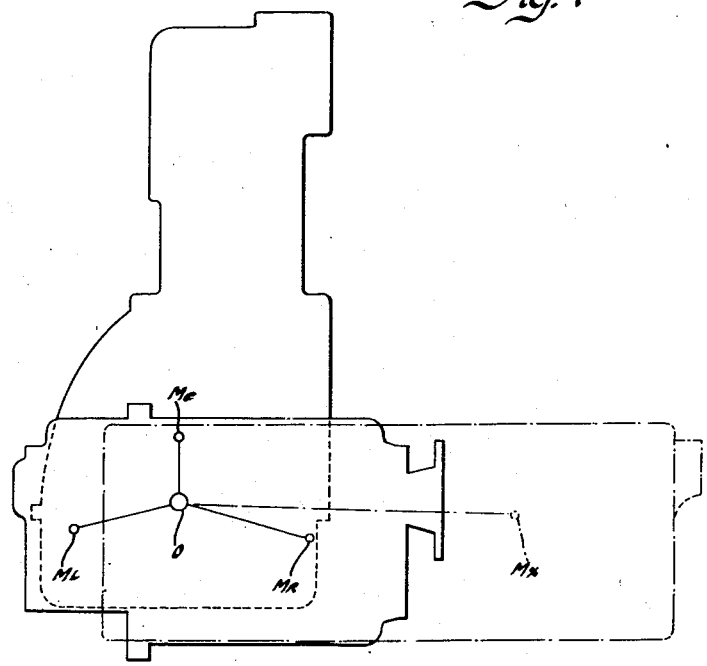
Fig. 8 is a vertical view of the structures in outline about the engine axis, the full line showing the Fig. 1 arrangement and the dashed line that of Fig. 7.

Both Figs. 7 and 8 are applied to the rear engine drive of a large vehicle such as an intercity bus. It will be noted that the permitted angles between the propeller shaft P and the centerline of the engine shaft are much less acute with the present invention, making higher drive efficiency possible. In the present arrangement, the axle differential may be located approximately on the vehicle centerline, as shown, because of the lower degree of angularity above mentioned, and furthermore, that the lateral distribution of mass of the whole power plant and drive mechanism with respect to the vehicle centerline is more nearly ideal. Because of the crowned roads still so widely used, there is a tendency for excessive wear of the right rear tires of vehicles, and experience teaches that uniform rear distribution of weight is an important feature, not only in obtaining even wear of the driving wheel tires, but also in the facilitating of accurate steering and handling by the driver.

For added utility in assembly and repair, the present novel assembly driving elements has the advantage of receiving the engine torque at an ideal point very close to the center between the end bearings 26 and 27, for the transmission shaft, and flexure of the latter at its mid-point is prevented by the long sleeve 22 and the rigid web and bearing construction shown in Fig. 1.

The reduction drive from the sleeve 22 to the counter shaft is had at a point immediately to the center plane of the transmission shaft, and that the third and fourth gear torques are taken with torque reaction lever arms displaced therefrom.

It is believed novel to have the angle drive gear subject only to engine torque, and to have the torque reaction loads on the engine housing and the power plant mountings so reduced to a minimum by the resulting low location of the center of gravity.

The applicant has filed an application for Letters Patent S. N. 507,204 dated October 21, 1943, now Patent No. 2,435,930, issued February 10, 1948, disclosing an angle drive arrangement involving the use of a fluid torque converter displaced angularly in the manner shown in the present disclosure, and the mechanism herewith is directly interchangeable with the aforesaid application construction with a minimum of effort and displacement of parts.

With respect to the superimposed patterns of Fig. 8, the rear engine transmission unit represents a problem of mass disposition as well as one of adequate support for the angular drive with respect to the engine and power plant masses.

As is commonly known, present day engines are mounted with carefully measured yielding supports which assist in absorption of abrupt torque shocks.

Assuming a shaft torque impulse of positive amplitude being delivered by the engine, the corresponding reaction torque felt on the engine mounting is negative. The flow of the positive impulse thru the angular gear drive, and on thru the gearbox to the propeller shaft is accompanied by a resulting development of torque reaction over the period of time before the impulse is dissipated, which is referred back to the common power plant mounting, by incremental additions as the impulse deflects the various parts of the drive and support assembly.

The mass of the average engine installation is reasonably symmetrical about the axis, and the neutral reference plane ordinarily bisects the offcenter mass portions.

In adding a transmission mass to be likewise supported on the engine mounting for torque reaction, if the extra mass is offset or unbalanced with respect to the axis of motion, the lack of symmetry of mass to axis and to support creates a special problem in dealing with the resultant torque reaction forces, which are increased in complexity when the spacial distribution of drive units comprises the placing of the transmission mass at an angle to the engine axis, as shown in the present invention.

It is known in the prior art to use a system in which this problem is attempted to be solved by divorcing the torque reaction supports of engine and transmission thru the interposition of a special bearing which permits limited rocking of the transmission with respect to the engine about the engine axis.

If in such constructions the transmission and engine casings are rigidly held together, and the engine supports taking the torque reaction for both, the overhang of the transmission mechanism with respect to the engine axis creates an unbalanced mass condition, adding to the difficulties of providing adequate support for torque reaction, and if arranged with the transmission center at an angle to the engine center, this problem is enlarged.

The applicant's construction avoids the unbalanced mass effect by distributing the transmission mass with respect to the engine centerline approximately evenly, as shown in Fig. 8 herewith. The point O represents the intersection of the transmission and engine centerlines, the angle $M_e$—O—$M_r$ being the angularity of the drive from engine to transmission center.

A resolving of the transmission mass moment arms to the axis O is shown by eye inspection of the figure to have the more concentrated mass portion at the left closer to the axis than the less concentrated portion at the right.

The straddling of the transmission mass centers with respect to point O departs from the prior art. A further point of distinction lies in the distribution of the torques to be handled by the gears with respect to the transmission bearings, discussed elsewhere herein. The mass centers $M_L$ and $M_R$ refer to the moment arms of the transmission of the present invention referred to the center O.

Comparatively the moment arm $M_x$—O of the earlier type of transverse drive is long, has no compensative balance effect, and is related angularly to the arm O—$M_e$ such that torsional balancing of the whole mass is a somewhat difficult problem which is circumvented by the straddling of the transmission masses of the present arrangement.

The Letters Patent to J. Haltenberger U. S. 2,032,876 issued March 3, 1936, shows a transversely-mounted engine coupled to a parallel intermediate shaft and gearbox by a Morse chain, the transmission output shaft being universally-jointed to the rear axle differential at a small angularity. A modification shows parallel gear coupling instead of the Morse chain, and a central differential mounted as a unit with the engine and driven by parallel output shaft. The latter requires swinging wheel shafts.

This patent for example, does not provide the best use of the engine compartment space and it does not duplicate the useful result of the mass distribution and compartmenting for unit replacement and repair, shown herein.

A further desirability of dividing the power plant assembly of the invention into unit subassemblies, is the superior ease of service, repair and replacement. The separation of the low torque and high torque groups herein permits the service operator to save time and expense in being able to deal selectively with the sub-assembly groups requiring attention, and without disturbing the other sub-groups.

This is highly essential to operators of vehicles which have to be kept in practically continuous operation for best service to the public or to the user.

It is desirable to place the rear axle differential power input point near the centerline of the vehicle, while allowing clear space within the rear power-plant compartment, a result not readily obtainable with the prior patented arrangements. It is of further utility to divide the transmission into mass sections straddled across the engine centerline, for better support of torque and for diminishing the height of the mass center of the engine and drive mechanism.

The maintenance of tactile feel by the operator of gear position stations, in remote controls, is always a difficult problem, due to the fact that vehicle frames weave and distort under load and the flexibly mounted power plants provide additional motion components which tend to be transmitted into vibrations of the controls while destroying the operator's feel of the mechanism. In the present invention these troubles are overcome by first utilizing a single shift selector and actuator shaft, having limited angularity at its articulation points U, supported in the frame for both sliding and rotation as shown by the mechanism at W, Fig. 1b, and arranged to duplicate the movement of the operator's control head, as in Fig. 3, in the motion of the transmission control head diagrammed in Fig. 2.

The point of application of the control mechanism on the top of the casing 100a, with the master shaft 110 entering same at an angle, as shown in Fig. 1, is so taken that the net distortion of distancing upon the adjacent linkage at 204 for the rocking bearing W and the coupling joint U is insufficient to disturb the normal feel and setting of the lever 120, of Fig. 3.

The above advantages are believed clearly understandable of the invention of the drive arrangement and control, and the utility herein.

From the foregoing description of the construction and operation of the example of the invention herewith, it is clear that the advantages set forth in the preamble of the specification and in the main body of the text thereof are amply provided for. It will be seen that the present invention embodies novelties in the power drive arrangement, in the arrangement of the masses, in the compartmenting of the drive elements for adequate support and accessibility, and in the control system which, while mechanical, affords the operator full manual feel of the operative movements of the control members of the power drive assembly, although the latter is placed remotely at the opposite end of the vehicle from the driver's station. Further and additional advantages are set forth in the appended claims, and it should be understood that various changes and substitutions may be made in the details of construction and arrangement of the members and parts without departing from the spirit of invention or from the scope of the appended claims.

I claim:

1. In a power transmission assembly, a power input sleeve having adjacent input and reduction output gears, a compartment for said gears with bearings in either wall thereof for said sleeve, a main output shaft supporting a plurality of freely revoluble gears and carrying clutches for coupling individually to said freely revoluble gears, a countershaft member having gears at either end for transmitting reduction speed ratios to said main shaft supported gears and having a centrally located power input gear driven from said sleeve gear, a bearing adjacent said input gear supported by one wall of said compartment and said output gears and mating countershaft gears being arranged into two groups one of which is at one side of the said power input gear and the other of which is at the other side of said power input gear.

2. In the combination set forth in claim 1 the sub-combination of a housing for said assembly, said housing including said gear compartment of end webs of said housing supporting said main shaft and said countershaft and of centrally located internal webs of said housing supporting said sleeve one of which supports said countershaft.

3. In the combination set forth in claim 1 the sub-combination of a housing for said assembly including said compartment having plural internal webs of said compartment, and of bearings for said sleeve supported in said internal webs.

4. In motor vehicle drives, a transmission assembly, a composite transmission casing therefor, a transmission main output shaft supported at each end of said casing, a transmission input shaft concentric therewith located centrally between the ends and surrounding a portion thereof, a gear fixed to said input shaft, a power output coupling splined to said main shaft, countershaft gearing driven continuously by said gear, a first group of gear elements including a low and a second speed gear driven continuously by said countershaft gearing, a second group of gear elements including a third gear driven by said countershaft gearing and a direct drive coupling, a sleeve splined to said main shaft adjacent one end thereof and affording bearing support for said low and said second speed gears, a jaw clutch splined to said sleeve adapted to engage said gears selectively to drive said main shaft, a jaw clutch member splined to said main shaft adjacent the other end thereof and said coupling and adapted to engage said third gear or said coupling, and control means for said jaw clutches operative to engage them one at a time axially with one of said gears or said coupling.

5. In the combination set forth in claim 4, the sub-combination of a reverse input gear included in said countershaft gearing, a reverse idler gear adapted to mesh with same, a ring of gear teeth on said first named jaw clutch, and a control element moved by the said control means for meshing said idler gear with said countershaft gearing and for meshing the said idler gear with said ring of teeth, said control element being operative to perform the said meshing only when said jaw clutches are not engaged with any of the said gears or said coupling, in order to establish reverse drive between said input and output shafts.

6. A vehicle drive device including a power plant assembly embodying a transversely mounted engine and concentric main clutch having a clutch driven shaft, a driving axle and wheel driving assembly located forward of the said engine, a differential device for said axle located substantially midway between the wheels thereof, a torque converting bevel gear unit of fixed ratio driven by said clutch driven shaft, a transmission casing supporting said unit and arranged diagonally with respect to the centerline of said engine, a power transmission driven by said unit and supported in said casing, a propeller shaft concentric with said transmission and casing and coupled to drive said differential device continuously, an arrangement of said transmission casing wherein it is attached solidly to and supported by said engine, and divided into three gear group compartments, one adjacent the point of connection to said propeller shaft and enclosing the said unit, the other two compartments housing change-speed gear elements, a transmission output shaft constantly coupled to drive said propeller shaft and extending thru both said latter compartments, and a transmission input hollow shaft geared member driven by said bevel gear unit constantly geared to torque-converting output gearing in both said compartments and adapted to be coupled directly to said output shaft for direct drive, the compartment and casing arrangement providing an approximate balance of the masses of the gearing and casing with reference to the centerline of the supporting engine.

7. In motor vehicle drives, a composite housing having webs dividing same into plural compartments for enclosing a transmission assembly, said housing having a first section for enclosing a low reduction and reverse gear group in one compartment, said first section likewise providing an input gear compartment, and a second section attached to said first section supporting a third and direct drive gear group, an input gear group located concentrically between said compartments supported in said first section, an engine clutch housing forming part of the said first section, a clutch in said clutch housing having an output shaft bevel gear coupled to said input gear group, a transmission load shaft driven by the gears of said groups, an end web of said first section supporting one end of said load shaft two central webs of said first section supporting said input gear group, an end web of said second section supporting the opposite end of said load shaft, bearings in said webs supporting said input gear group and said load shaft a countershaft geared member driven by said input gear group and driving said load shaft thru said first and second gear groups, bearings for said countershaft in said end webs, and end plates for said end webs providing individual access to said first two gear groups by removal of said plates, without detachment of any of said bearings.

8. In power transmission mechanisms, an engine shaft, a clutch driven shaft in alignment therewith, a friction clutch operative to connect said shafts, a bevel gear unit having an input member driven by said clutch driven shaft, an output member of said unit, a change speed gearing having a hollow input shaft connected to said output member and a transmission output shaft with its centerline arranged diagonally to that of said clutch driven shaft, the said centerlines intersecting, a first housing section for said clutch and said bevel gear unit attached to said engine and arranged to support said clutch shaft and said unit, to support one end of said diagonally arranged transmission output shaft and to enclose a first gear group of said gearing arranged to drive said output shaft, a second gear group of said gearing concentric with said first group, a second housing section for said second gear group attached to one side of said first section, the arrangement of said housing sections providing a central compartment for said unit and said hollow shaft formed by webs of said first section, a second compartment adjacent said central compartment and enclosing said first gear group at one end of said gearing, and a third compartment adjacent said central compartment and enclosing said second gear group, the arrangement of said sections and said groups permitting individual detachment of said second section for removal and replacement of said second gear group of said gearing.

HANS O. SCHJOLIN.

(References on following page)

REFERENCES CITED

The following references are of record in the file of this patent:

UNITED STATES PATENTS

| Number | Name | Date |
|---|---|---|
| 1,338,777 | Johnson | May 4, 1920 |
| 1,856,284 | Lavoie | May 3, 1932 |
| 2,096,541 | Haltenberger | Oct. 19, 1937 |
| 2,125,441 | Haltenberger | Aug. 2, 1938 |
| 2,180,116 | Lapsley | Nov. 14, 1939 |
| 2,195,479 | Buchner | Apr. 2, 1940 |
| 2,195,509 | Buckendale | Apr. 2, 1940 |
| 2,197,758 | Daub | Apr. 23, 1940 |
| 2,262,456 | Grater | Nov. 11, 1941 |
| 2,266,397 | Norelius | Dec. 16, 1941 |
| 2,270,980 | Tidball | Jan. 27, 1942 |
| 2,289,646 | Grater | July 14, 1942 |
| 2,295,896 | Grater | Sept. 15, 1942 |
| 2,306,644 | Sewell | Dec. 29, 1942 |
| 2,324,542 | Schon | July 20, 1943 |
| 2,399,613 | Backus | May 7, 1946 |